Feb. 8, 1966          K. H. IDEL          3,234,455
APPARATUS INCLUDING MARKER MEMBERS AND SENSING MEANS FOR
MEASURING SETTLING OF AN EARTH DAM AND LIKE STRUCTURE
Filed Jan. 3, 1962          2 Sheets-Sheet 1
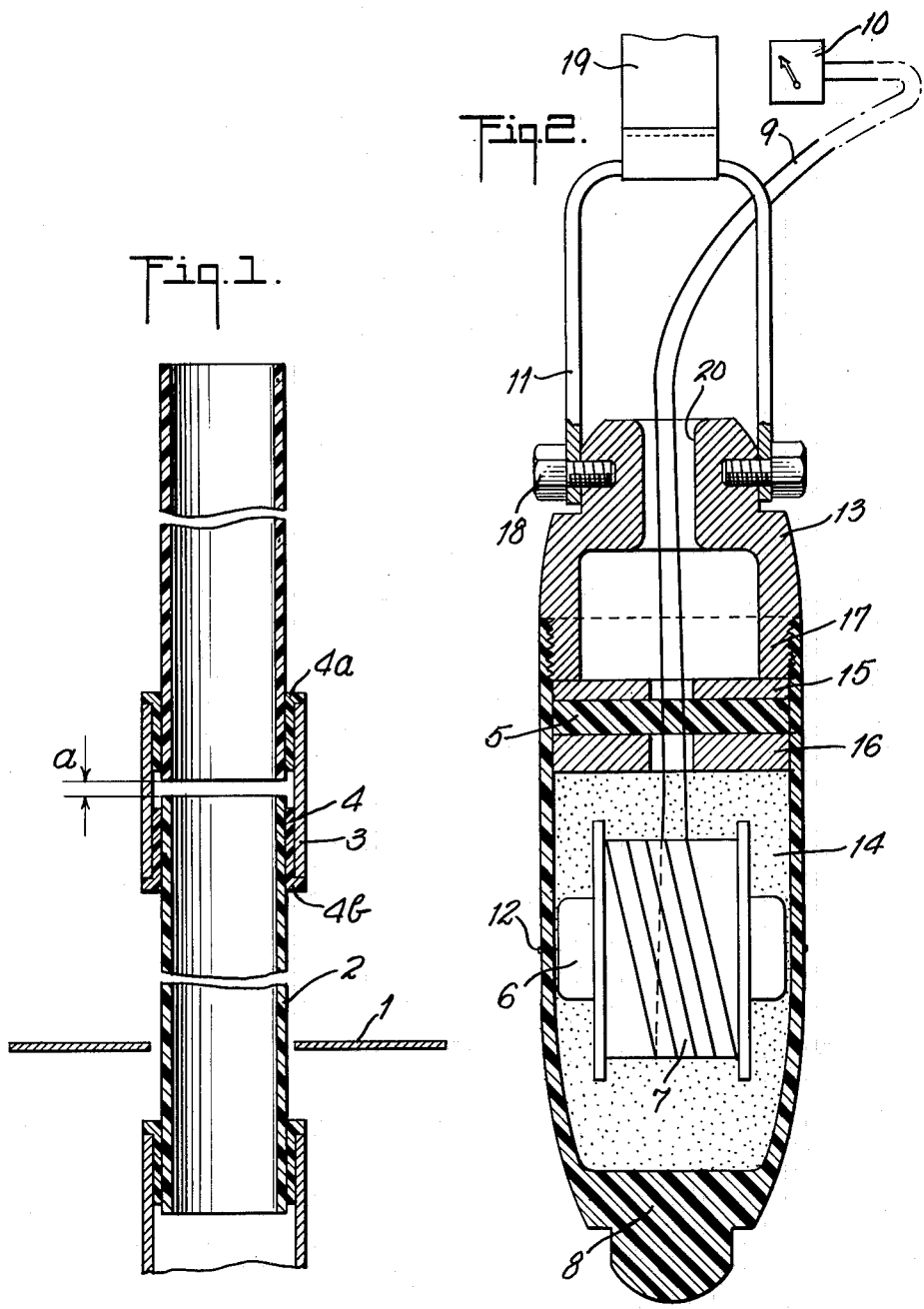
INVENTOR.
KARL HEINZ IDEL
BY *Walter S. Gleston*
ATTORNEY

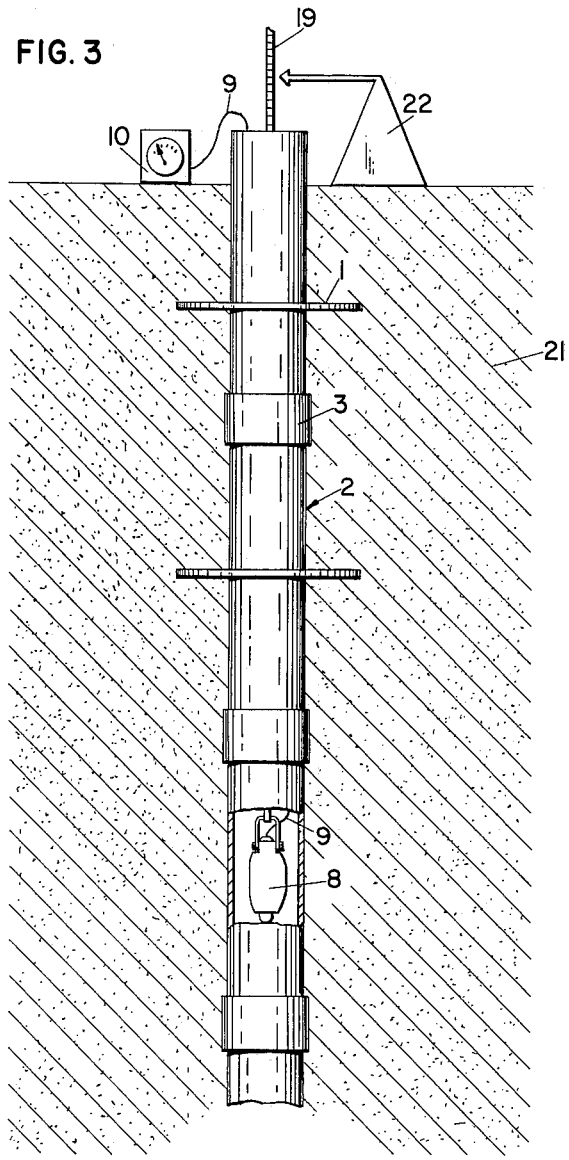

United States Patent Office 3,234,455
Patented Feb. 8, 1966

3,234,455
APPARATUS INCLUDING MARKER MEMBERS AND SENSING MEANS FOR MEASURING SETTLING OF AN EARTH DAM AND LIKE STRUCTURE
Karl Heinz Idel, Olbrichstrasse 14, Essen, Germany
Filed Jan. 3, 1962, Ser. No. 164,127
10 Claims. (Cl. 324—34)

The present invention relates to the logging of formations of particulate materials, such as earth, sand, gravel, broken rock, etc. and more particularly to an apparatus for investigating or measuring the settling and shifting of the material in embankments, dams and foundations.

Such investigations have been carried out, for instance, by positioning marker bodies in vertically spaced strata of the formation to be investigated, placing a vertically extending tube next to the marker bodies and positioning a projecting edge of the marker bodies within the tube. A marker indicating device may then be lowered into the tube on a measuring tape and any horizontal alignment of the indicator with a respective one of the marker bodies is mechanically established by the engagement of a detent on the indicator with the projecting edge of the respective marker.

This system has the disadvantage that the marker bodies cannot freely follow the relative movement of the respective strata of particulate material wherein they are placed because the tube will be easily jammed during lateral movements of the material, and the marker bodies become fixedly connected with the tube. Due to the friction of a settling formation of particulate material with the tube wall and the limited movability of the jammed tube and marker bodies, marker indicating errors will be caused by the fact that the marker bodies do not freely follow the strata of the formation they were designed to mark and these portions will, therefore, not be indicated. Furthermore, sand or mud may enter the tube and thus cause misfunction of the detent mechanism.

This disadvantage in known systems for investigating the settling of particulate material is obviated in accordance with the present invention by providing a guide tube whose interior is completely sealed off from the surrounding particulate material. In such an apparatus, a measuring tape is attached to a marker indicating device and holds the indicating device when the device is lowered into the guide tube. The alignment between the respective marker bodies in the surrounding formation and the indicating device is established by any well known means responsive to the marker bodies upon alignment therewith, means being provided for transmitting a measurable signal whereby the alignment of a respective marker body with the responsive means is indicated. This may be done in a known manner by magnetic fields, induction currents or radioactive indicator means.

In this manner there need be no close mechanical connection between the marker bodies and the tube so that the marker bodies may freely follow the settling movement of the material in which they are embedded.

Marker indication may be obtained by a generally known induction logging system, such as used for instance in U.S. Patents Nos. 2,582,314 and 2,582,315 or German Patents Nos. 898,642 or 920,392. In such systems, the position of markers in the formation is indicated by changes in the induction current caused by the markers. For instance, magnetic markers, iron, zinc, bronze or sinter iron bodies are placed within an earth formation and the marker indicating device is a magnetic induction system responsive to these bodies. The same result is obtained with radioactive markers and radiation receivers as indicating means. It is also known to indicate a marker position by magnetic means alone.

In the preferred induction logging system, use is made of a plurality of substantially flat, horizontally extending magnetic marker bodies and a marker indicating device which includes a magnet having a horizontally extending polar axis for establishing a magnetic field upon alignment with the magnetic marker bodies and an induction coil responsive to the magnetic field. A flexible conductor connects the coil and a galvanometer so that changes in the coil current may be read from the galvanometer. The guide tube is of non-magnetic material, and the marker indicating magnet and coil are preferably arranged in a non-magnetic cartridge housing. Preferably, the cartridge housing is filled with a solid carrier mass, such as paraffin or a synthetic resin, which supports the magnet and coil in the housing. Entry of dirt and/or moisture into the interior of the cartridge housing may be prevented by providing a cap therefor and a gasket between the cap and the housing.

In accordance with a preferred embodiment of the invention, the guide tube consists of a plurality of tube sections. Adjoining ends of the tube sections are connected by sealing means which includes at least partly resilient bushing means. In this manner, some axial deviation of the tube and/or some rotational or torsional movement of adjoining tube sections in relation to each other is possible.

The above and other objects, advantages and features of the present invention will be more fully understood by reference to the detailed description of one specific embodiment thereof, taken in conjunction with the accompanying drawing wherein FIG. 1 is a longitudinal cross section of the guide tube and cooperating marker for the indicating device of this invention;

FIG. 2 is a longitudinal cross-section of the indicating device; and

FIG. 3 shows a dam having the guide tube of FIG. 1 with the sensing device of FIG. 2 embedded therein, the view being in elevational section, and the tube being partly broken away to show the sensing device.

Referring now to the drawing and first to FIG. 1, there is shown one of the several disc-shaped markers 1 which are positioned on a vertical guide tube 2 at different, vertically spaced levels. The horizontally extending marker bodies have central openings which are generally vertically aligned with each other to confine the guide tube 2 with sufficient clearance for axial movement and free rotation of the markers relative to the tube. The markers thus form an interconnected marker system having markers vertically spaced in a formation of particulate material in which the tube 2 is embedded during use of the apparatus. In the illustrated, magnetically operated arrangement, the markers consist of a magnetic material and may be steel plates, for instance. The guide tube 2 is of non-magnetic material, for instance a suitable plastic. The diameters of the openings exceed the outer diameter of the tube 2 so that, as seen in FIG. 1, there is clearance between the tube and the markers. Longitudinal movement and rotation of the tube are not transmitted to the markers which remain free to follow any movement of the portion of the formation which they are designed to mark, e.g. the settling of an earth dam.

As will be seen, the tube 2 is sub-divided into a plurality of tube sections. Adjoining tube sections are connected by a bushing 3 which is at least partly resilient, and is lined with axially spaced sealing sleeves 4a and 4b. The tube section ends are engaged by the sealing sleeves and may be rotated in relation to each other or moved longitudinally relatively to each other by the distance a. The sealing sleeves prevent any foreign matter from entering the guide tube 2.

The marker sensing or indicating device, which is shown in FIG. 2, is adapted to be lowered into tube 2 so as to indicate the location of the vertically spaced markers 1 when an index means 12 on the indicating device is in horizontal alignment with the respective marker 1.

As shown, the indicating device comprises a non-magnetic, water-impermeable cartridge housing 8, which may be made of any suitable material, such as plastic. A permanent magnet 6 carrying a coil 7 is mounted in the interior of the housing 8. A carrier mass 14 of non-magnetic material, such as paraffin, fills the interior of the housing and holds the magnetic induction system 6, 7 in a position in which the magnetic poles define a substantially horizontal axis and the index means 12 is located on this axis. The cartridge housing 8 is sealed by a threadedly mounted non-magnetic cap 13. A rubber or like resilient gasket 5, which is held between two non-magnetic washers 15, 16, is placed on the carrier mass in housing 8 and is compressed by the threaded portion 17 of cap 13 pressing against the washer 15. In this manner, the magnetic induction system is firmly and securely held in position within the impermeable cartridge housing 8.

A handle or yoke 11 is attached to the cartridge cap 13 by bolts 18. The indicating device is suspended from a measuring tape 19 carrying suitable calibrations and engaging the yoke 11.

FIG. 3 shows sections of the guide tube 2 connected by bushings 3 and embedded in a vertical position in the particulate material 21 of an earth dam. Two vertically spaced markers 1 are arranged on the portion of the tube 2 visible in FIG. 3. The cartridge housing 8 is suspended in the tube 2 from the measuring tape 19 which projects upward from the tube 2, and is attached to a support, not illustrated. A fixed marker 22 stands on the ground adjacent the tube 2 and provides a reference point for locating the cartridge 8. The lead wire 9 extends upward from the cartridge 8 and out of the tube 2 to the galvanometer 10.

The logging apparatus illustrated operates as follows:

A marker system consisting of a guide tube 2 interconnecting a series of vertically spaced magnetic markers 1 is positioned in the particulate material 21 of the dam or embankment to be logged. When logging is desired, the cartridge 8, 13 is lowered by its measuring tape 19 into the tube 2. When the cartridgde approaches one of the steel plates 1, the influence of the plate on the magnetic field generates an induction current in coil 7. Lead wires 9 connect the coil to the galvanometer 10. The lead wires pass through the gasket 5 and out of the cartridge through a central bore 20 in cartridge cap 13.

Even at the smallest vertical movements of the cartridge in the guide tube, the magnetic field strength will change and cause a corresponding change in the induction current in coil 7. Thus, the deflections of the meter accurately indicate the horizontal alignment of the index 12 with a marker 1. The distance of the marker 1 from the fixed marker 22 may then readily be read from the measuring tape, the zero mark of the tape coinciding with the magnetic axis or index 12.

Since the markers 1 are spaced from the guide tube, a vertical movement of the tubes or its shortening or lengthening by distances a at the joints of the tube sections will in no way influence the results of the measurements because it is not the tube length but the position of the markers which is measured at all times, in relation to a fixed reference point above ground which is independent of the tube.

Equally, the relatively small deviations of the guide tube from the vertical, which may be encountered in practical operations, do not significantly change the accuracy of the readings on the measuring tape. However, if this should constitute a problem under given conditions, the exact position of the tube in space may be ascertained by means which are well known in the art and the parameter read on the measuring tape may be corrected accordingly.

While the present invention has been described in connection with one specific embodiment, it will be clearly understood that many modifications and variations may occur to the skilled in the art, particularly after benefiting from the present teaching, without departing from the spirit and scope of this invention as defined in the appended claims. More particularly, while an induction logging system has been described and illustrated, it is well within the skill of the art to replace this, for instance, by a radioactive logging system wherein the marker and cooperating index means are transmitters and receivers of radioactive radiation. As a matter of fact, the marker-index system may consist of any suitable signal transmitting and receiving means wherein the receiving means will respond to a transmitted signal when the transmitting and receiving means are in alignment.

What I claim is:

1. An apparatus for measuring relative movement of a plurality of strata in an earth dam and like structure of particulate material, said apparatus comprising, in combination:
    (a) an elongated guide tube having a longitudinal axis and adapted to be embedded in said material;
    (b) a plurality of marker members formed with respective openings therethrough, said tube being confined in said openings with sufficient clearance for axial movement and for rotation of said marker members relative to said tube while said marker members are embedded in respective axially spaced strata of said material;
    (c) sensing means axially movable in said tube for sensing said markers and for emitting a signal responsive to alignment with a marker in a direction transverse of said axis; and
    (d) measuring means for measuring the distance of said sensing means from a reference mark outside said tube.

2. The apparatus of claim 1, wherein said guide tube includes a plurality of axial tube sections, and resilient bushing means sealingly interconnecting adjoining ends of said tube sections.

3. The apparatus of claim 2, wherein said bushing means has sufficient resiliency to permit limited movement of adjacent tube sections relative to each other toward and away from a position of axial alignment, and limited rotational movement of said tube sections relative to each other.

4. An apparatus as set forth in claim 1, further comprising galvanometer means, said marker members being substantially flat bodies of magnetic material extending in respective planes transverse of said axis; said sensing means including a magnet having two poles spaced transversely of said axis, and a coil of conductive material about said magnet and connected to said galvanometer means; and said measuring means including an elongated measuring member having a terminal portion attached to said sensing means, and extending axially from said sensing means outward of said tube.

5. The apparatus of claim 4, wherein said sensing means further include a housing, a carrier mass filling said housing and supporting the magnet and coil therein.

6. The apparatus of claim 4, further comprising a housing sealing said coil and said magnet against dirt and moisture.

7. An apparatus as set forth in claim 1, wherein said marker members are substantially plate shaped.

8. An apparatus as set forth in claim 1, wherein said marker members are flat bodies, each body having two opposite faces extending transversely of said axis, said opening connecting said faces, the spacing of said faces being smaller than any dimension of said faces transverse of said axis.

9. An apparatus as set forth in claim 1 wherein said marker members are of a material different from the material of said guide tube.

10. An apparatus as set forth in claim 1, wherein said marker members are of magnetic material and said guide tube is of non-magnetic material.

References Cited by the Examiner
UNITED STATES PATENTS

| | | | |
|---|---|---|---|
| 2,228,623 | 1/1941 | Ennis | 324—37 |
| 2,250,703 | 7/1941 | Crites et al. | 324—8 |
| 2,476,137 | 7/1949 | Doll | 324—34 |
| 2,527,170 | 10/1950 | Williams | 324—34 |
| 2,550,004 | 4/1951 | Doll | 324—34 |

WALTER L. CARLSON, *Primary Examiner.*